United States Patent [19]
Ohmura

[11] Patent Number: 5,893,650
[45] Date of Patent: Apr. 13, 1999

[54] VIEWFINDER SYSTEM AND SINGLE-LENS REFLEX CAMERA HAVING THE SAME

[75] Inventor: Yusuke Ohmura, Yokohama, Japan

[73] Assignee: Canon Kabushiki Kaisha, Tokyo, Japan

[21] Appl. No.: 08/986,954

[22] Filed: Dec. 8, 1997

[30]  Foreign Application Priority Data

Dec. 10, 1996 [JP] Japan .................................. 8-346768
Feb. 5, 1997 [JP] Japan .................................. 9-038473
Nov. 28, 1997 [JP] Japan .................................. 9-344477

[51] Int. Cl.$^6$ ........................................ G03B 17/00

[52] U.S. Cl. ................... 396/51; 396/296; 396/386

[58] Field of Search ........................... 396/296, 386, 396/385, 51

[56]  References Cited

U.S. PATENT DOCUMENTS 5,485,241  1/1996  Irie et al. .................................. 396/51
5,754,900  5/1998  Suda ...................................... 396/296

Primary Examiner—David M. Gray
Attorney, Agent, or Firm—Robin, Blecker & Daley

[57]  ABSTRACT

A viewfinder system adapted for a single-lens reflex camera includes an optical system which guides light from an object to a viewer, a display part which displays information in a visual field of the optical system, a light combining member which is disposed in an optical path of the optical system and combines the light from the object with the information displayed by the display part, the light combining member having spectral transmission characteristics which differ with angles of incidence of light, and a correction member for keeping a spectral transmission characteristic of the entirety of the optical system substantially constant irrespectively of the angles of incidence of light on the light combining member.

30 Claims, 9 Drawing Sheets

VIEWFINDER SYSTEM AND SINGLE-LENS REFLEX CAMERA HAVING THE SAME

BACKGROUND OF THE INVENTION

1. Field of the Invention

The present invention relates to a viewfinder system, and more particularly to a viewfinder system adapted for a single-lens reflex camera in which various kinds of photo-taking information are displayed within the field of view of the viewfinder.

2. Description of Related Art

Heretofore, intra-viewfinder display devices adapted for single-lens reflex cameras and the like have been variously developed. These display devices are arranged to make simultaneously viewable, through a viewfinder optical system, a light measuring range and an automatic focusing distance measuring area arranged on a focusing screen or in a position optically equivalent thereto and various kinds of photo-taking information as well as an object image formed on the focusing screen by a photo-taking lens.

For example, it has been known, as disclosed in Japanese Laid-Open Patent Application No. SHO 55-18664, to dispose, in the neighborhood of a focusing screen, a relief-type hologram in which information obtained by interference of an object wave and a reference wave is converted into surface unevenness and is then recorded, and to provide a display inside a viewfinder by reproducing an image from the hologram. However, it is extremely difficult to form a high quality hologram image on a focusing screen, and the arrangement for the relief-type hologram is expensive as it requires a high level of production technology.

Another known intra-viewfinder display device, as disclosed in Japanese Laid-Open Patent Application No. SHO 58-181034, is arranged to superimpose a liquid crystal display plate on a focusing screen and to provide a display inside the viewfinder by the liquid crystal display plate. According to this arrangement, however, the position of the liquid crystal display in the direction of an optical axis does not exactly coincide with the image forming position on the focusing screen of a photo-taking lens. This positional discrepancy causes some deviation of diopter in viewing through the viewfinder. In addition to that, the liquid crystal member always exists in the optical path of the viewfinder. In the case of a single-lens reflex camera which is required to have a clear, delicate luminous efficiency, the presence of the liquid crystal member in the viewfinder optical path presents a problem as it greatly lowers the quality and quantity of light of a viewfinder image.

BRIEF SUMMARY OF THE INVENTION

The invention is directed to the solution of the problems of the prior art mentioned above. It is, therefore, an object of the invention to provide a viewfinder system arranged to make both an image obtained within a viewfinder and display information superimposed on the image brightly viewable in a high quality state.

To attain the above object, in accordance with an aspect of the invention, there is provided a viewfinder system which comprises optical means for guiding light from an object to a viewer, display means for displaying information in a visual field of the optical means, light combining means disposed in an optical path of the optical means for combining the light from the object with the information displayed by the display means, the light combining means having spectral transmission characteristics which differ with angles of incidence of light, and correction means for keeping a spectral transmission characteristic of the entirety of the optical means substantially constant irrespectively of the angles of incidence of light on the light combining means.

Further, in accordance with another aspect of the invention, there is provided a single-lens reflex camera which comprises optical means for guiding light from an object to a viewer, display means for displaying information in a visual field of the optical means, light combining means disposed in an optical path of the optical means for combining the light from the object with the information displayed by the display means, the light combining means having spectral transmission characteristics which differ with angles of incidence of light, and correction means for keeping a spectral transmission characteristic of the entirety of the optical means substantially constant irrespectively of the angles of incidence of light on the light combining means.

The above and other objects and features of the invention will become apparent from the following detailed description of embodiments thereof taken in conjunction with the accompanying drawings.

DETAILED DESCRIPTION OF THE INVENTION

Hereinafter, preferred embodiments of the invention will be described in detail with reference to the drawings.

Figure 1:
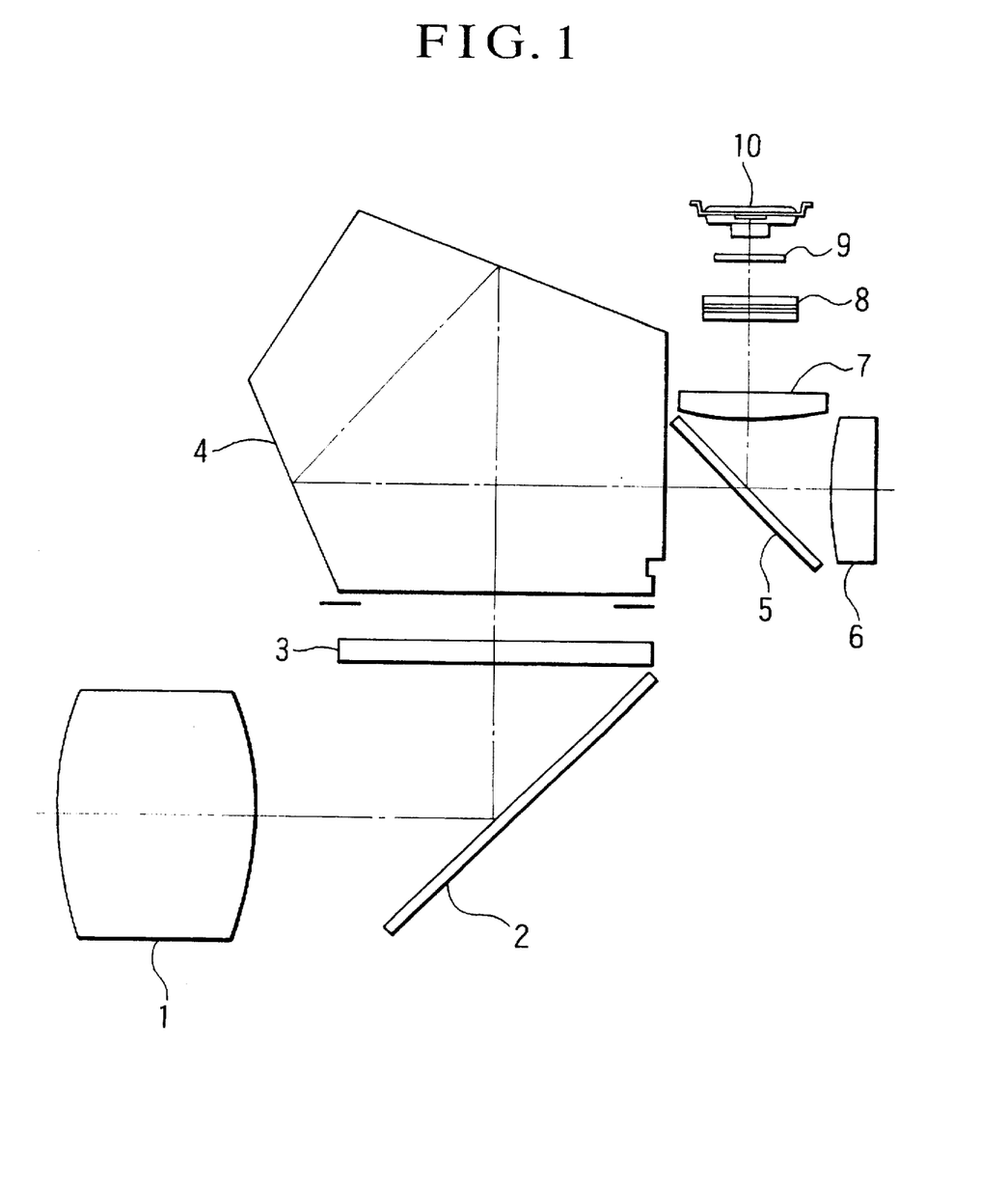
FIG. 1 is a schematic illustration showing in outline a single-lens reflex camera arranged according to the invention as an embodiment thereof.

FIG. 1 shows in outline the arrangement of a single-lens reflex camera according to an embodiment of the invention. Referring to FIG. 1, a quick return mirror 2, a focusing screen 3, a pentagonal prism 4, a light combining member 5 which is composed of a dichroic mirror, and an eyepiece 6 are arranged along the optical path of a photo-taking lens 1. In the path of light incident on the light combining member 5, there are serially arranged from on the side of the light combining member 5, a projection lens 7, a liquid crystal panel 8 which is provided for displaying characters and figures, a condenser lens 9 which is composed of a Fresnel lens having a positive power, and a light source 10.

A light flux from an object to be photographed is imaged on the focusing screen 3 through the photo-taking lens 1 and the quick return mirror 2 which is arranged to be retracted from a photo-taking optical path in taking a shot. The image thus formed on the focusing screen 3 is viewable by the camera operator, i.e., a viewer, through the pentagonal prism 4, the light combining member 5 and the eyepiece 6.

The focal length of the eyepiece 6 is set at a length slightly longer than an air-reduced optical path from the focusing screen 3 to the eyepiece 6 and is set usually to have −1 diopter or thereabout. The eyepiece 6 may be arranged to be a lens system having a variable principal point position or to have its focal length variable by a plurality of movable lenses, instead of a fixed single lens as shown in FIG. 1.

A light flux emitted from the light source 10 comes to enter the condenser lens 9. The condenser lens 9 is arranged to put the light source 10 and the pupil of the operator into a conjugate image forming relation and thus acts to cause a display light flux to efficiently enter the pupil of the operator. A distance between the light source 10 and the condenser lens 9 is preferably arranged to be short for reduction in size of the camera. However, with this distance reduced, the power of the condenser lens 9 must be increased in order to maintain the conjugate relation between the pupil of the operator and the light source 10.

In view of this, the embodiment is arranged to use a Fresnel lens as the condenser lens 9 for reduction in thickness of the lens and also for reduction in size of the camera. To be exact, the image forming relation between the light source 10 and the pupil of the operator is determined by a composite condensing power of the condenser lens 9 and the projection lens 7. The light flux condensed by the condenser lens 9 comes to enter the liquid crystal panel 8. Then, information composed of characters and figures to be superimposed on an image shown by the viewfinder (hereinafter referred to as a viewfinder image) is formed by the liquid crystal panel 8. The liquid crystal panel 8 is arranged to have desired characters and figures formed there beforehand. However, the liquid crystal panel 8 may be arranged to have some of these characters and figures formed with fine dots in desired shapes in providing a display.

In either case, at the liquid crystal panel 8, an area which is in the same shape as the information to be superimposed on the viewfinder image is arranged to become light transmissible at the time of display and to block light at any time other than the display time. In displaying information, the liquid crystal panel 8 is illuminated with the light of the light source 10. At that time, the area in the shape to be displayed alone allows the light to pass through there. For the purpose of enhancing the visibility of the display, a sheet having a light diffusing characteristic may be additionally arranged in the neighborhood of the liquid crystal panel 8.

A light flux having passed through the liquid crystal panel 8 is condensed by the projection lens 7. The light from the projection lens 7 is combined by the light combining member 5 with the viewfinder image, i.e., the light coming from the object. The combined light thus obtained comes to the pupil of the operator through the eyepiece 6 to be viewable by the operator. In this case, the condensing power of the projection lens 7 and that of the eyepiece 6 are combined to show the liquid crystal panel 8 in an enlarged state to the operator. Further, the focal length of the projection lens 7 and a distance between the projection lens 7 and the liquid crystal panel 8 must be set in such a way as to cause a virtual image of the object image obtained on the focusing screen 3 by the eyepiece 6 to be formed at the same distance as the distance of a virtual image obtained on the liquid crystal panel 8 by the projection lens 7 and the eyepiece 6.

Further, with the focal length of the eyepiece 6 assumed to be fs and the focal length of the projection lens 7 to be ft, the focal lengths of the lenses 6 and 7 are preferably arranged to satisfy the following relation formula:

$$fs/5 < ft < fs.$$

If the focal length ft of the projection lens 7 is arranged to exceed an upper limit set by the formula above, the effective area of the liquid crystal panel 8 must be increased according to an increase in distance between the projection lens 7 and the liquid crystal panel 8. Such arrangement not only incurs an increase in size of the camera but also lowers the illumination efficiency of the illumination system composed of the light source 10 and the condenser lens 9.

If the focal length ft of the projection lens 7 exceeds a lower limit set by the formula, on the other hand, the size of a pattern to be formed on the liquid crystal panel 8 becomes too small for manufacturing the same. Besides, the F-number of the projection lens 7 becomes too small to form the projection lens 7 with a single lens and would seriously lower the quality of a display image.

In the case of the embodiment, an aspherical lens is employed as the projection lens 7 for reduction in size of the camera and an increase in performance. By virtue of this, a display can be made without much image distortion over the whole display area and also without much diopter deviation.

Figure 2:
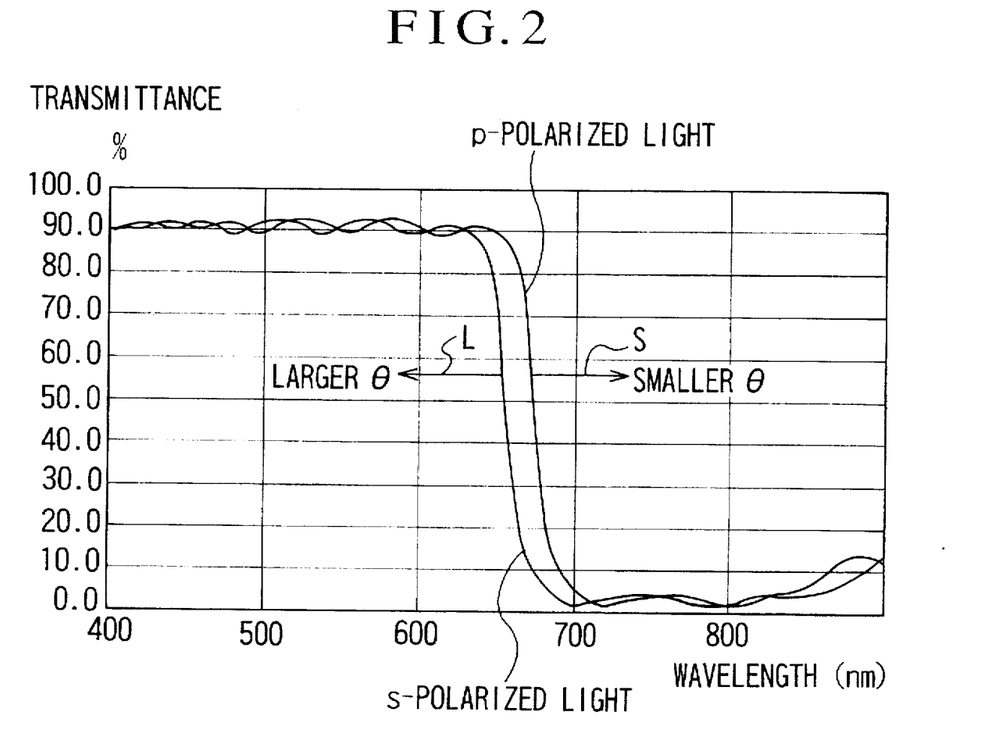
FIG. 2 shows the characteristic of spectral transmittance of a dichroic mirror in the embodiment.

In the embodiment, a dichroic mirror is employed as the light combining member 5. FIG. 2 shows the characteristic of spectral transmittance of the dichroic mirror obtained at an angle of incidence of 45 degrees. The dichroic mirror of such a characteristic can be manufactured by forming laminated layers of a dielectric material on a glass base plate. In the dichroic mirror, the wavelength dependency characteristic of the spectral transmittance always varies with the polarization direction of incident light except when the angle of incidence is zero, i.e., except when the light is perpendicularly incident on the dichroic mirror. As shown in FIG. 2, in this case, the transmittance is about 90% in the visible spectrum of wavelengths from 400 nm to wavelengths between 650 and 700 nm. At the red component of the visible light which has wavelengths above 600 nm, the transmittance of an s-polarized light becomes a mesial value at about 660 nm while that of a p-polarized light becomes a mesial value at about 680 nm.

Figure 3:
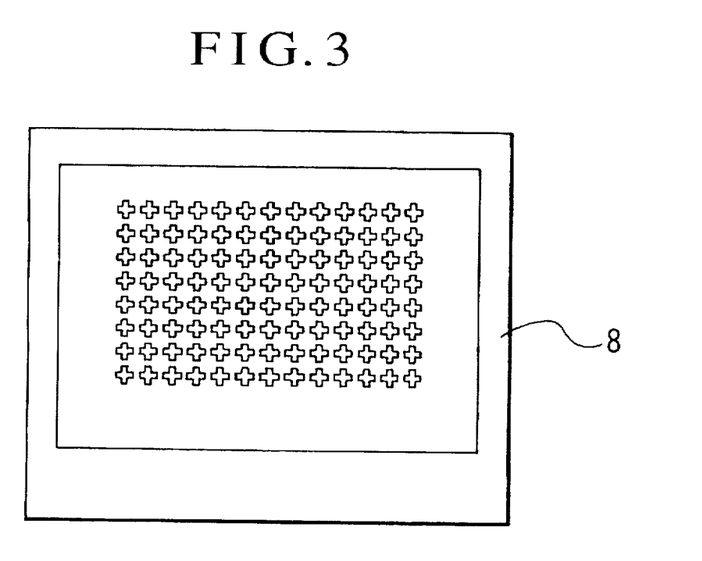
FIG. 3 shows a pattern to be displayed on a liquid crystal panel 8 shown in FIG. 1.

With the dichroic mirror having the above-stated characteristic used for the viewfinder optical system as the light combining member 5 shown in FIG. 1, an LED having its light emission center at about 660 to 680 nm is used as the light source 10. With the viewfinder optical system arranged in this manner, a light flux coming from the liquid crystal panel 8 which has a pattern as shown in FIG. 3 is almost completely reflected by the dichroic mirror to be guided to the pupil of the operator through the eyepiece 6.

On the other hand, about 90% of a viewfinder light flux coming from an object image formed on the focusing screen 3 passes through the dichroic mirror to be guided also to the pupil of the operator through the eyepiece 6. At that time, the liquid crystal panel 8 acts in such a manner that the light flux incident on the dichroic mirror from the display optical system is caused to become an s-polarized light, so that the efficiency of display can be enhanced by increasing the reflection efficiency of the display light flux. This advantageous effect can be attained even if the s-polarizing action is not perfectly accomplished. By virtue of the above-stated arrangement, a display of information in red color can be made as desired within the visual field of the viewfinder.

Figure 4:
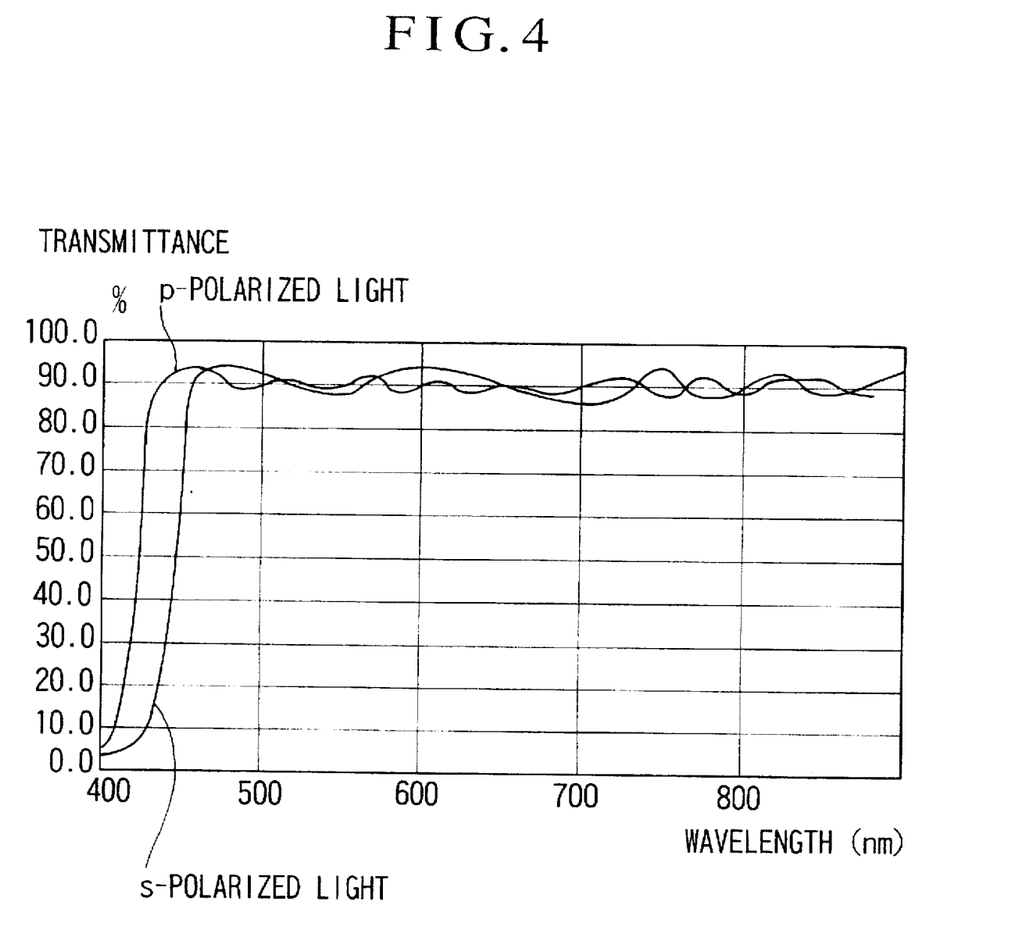
FIG. 4 shows the characteristic of spectral transmittance of another dichroic mirror.

FIG. 4 shows the characteristic of spectral transmittance of another dichroic mirror used for the light combining member 5. The spectral transmittance characteristic is obtained at an angle of incidence of 45 degrees. This dichroic mirror has a transmittance of about 90% at a visible spectrum of wavelengths above 450 nm which form the viewfinder image. In the visible light, the transmittance of an s-polarized light becomes a mesial value at about 450 nm while that of a p-polarized light becomes a mesial value at about 420 nm. With the dichroic mirror of this characteristic used for the viewfinder optical system in combination with the light source 10 having its light emission center at about 450 nm, a light flux from the display optical system is almost completely reflected by the dichroic mirror. Then, an information display is made in a purplish blue color within the viewfinder. The display light is guided to the pupil of the operator through the eyepiece 6.

While the dichroic mirror is employed as the light combining member 5 in the embodiment, use of a half-mirror which has almost no wavelength dependency in its transmittance and reflection characteristics is examined, as a reference example, as follows.

Figure 5:
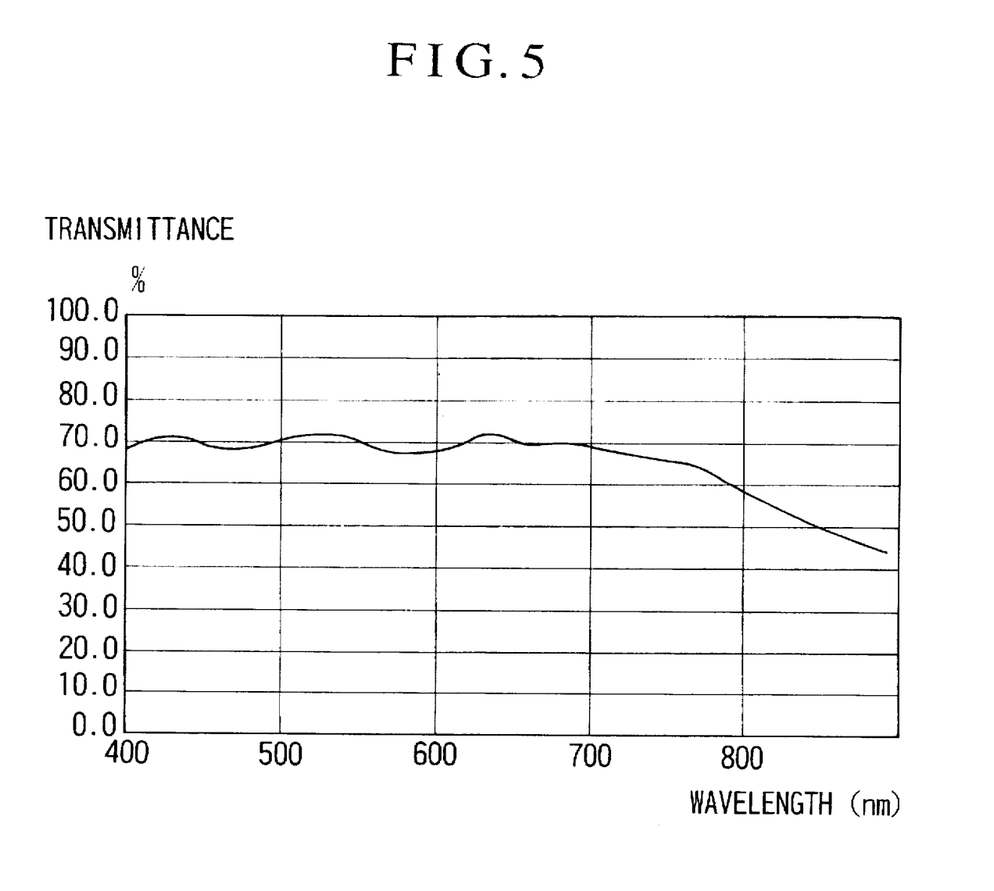
FIG. 5 shows the characteristic of spectral transmittance of a half-mirror as a reference example.

FIG. 5 shows the characteristic of the spectral transmittance of a half-mirror. The average transmittance factor of this half-mirror is about 70% within a range of wavelength from 400 nm to 700 nm. In a case where this half-mirror is employed as the light combining member 5 shown in FIG. 1, about 70% of a viewfinder light flux of an object image which is formed on the focusing screen 3 passes through the half-mirror to reach the pupil of the operator. On the other hand, about 30% of a light flux from the liquid crystal panel 8 is reflected by the half-mirror to reach the pupil of the operator in a state of being superimposed on the viewfinder image.

With a half-mirror of the spectral transmittance characteristic shown in FIG. 5 used as the light combining member 5, the light using efficiency attainable by the use of it is inferior to the use of the dichroic mirror as in the case of the embodiment. Both the viewfinder image and the information display by the liquid crystal panel 8 become extremely dark. In the case of the embodiment, on the other hand, both the viewfinder light flux of the object image formed on the focusing screen 3 and the light flux from the liquid crystal panel 8 can be highly efficiently guided to the operator by virtue of the use of the dichroic mirror.

However, as will be described later herein, the spectral transmittance characteristic of the dichroic mirror differs with the angles of incidence of light. In the case of a system as shown in FIG. 1, the light from an object to be photographed enters the dichroic mirror at various angles of incidence. Hence, due to the characteristic of the dichroic mirror, the hue of the viewfinder image changes according to the direction of viewing.

Figure 6:
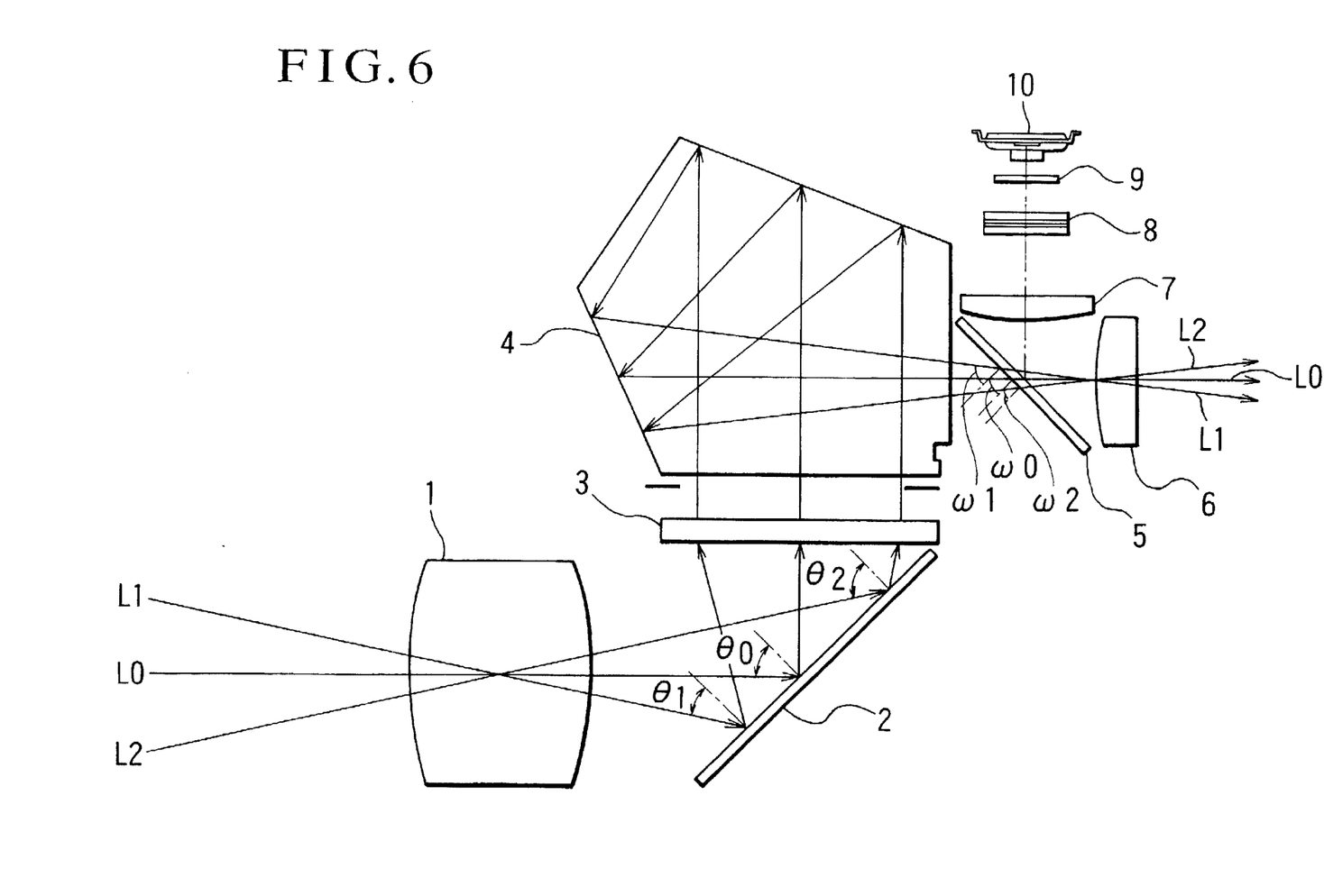
FIG. 6 shows how angle of incidence on the dichroic mirror varies with the direction of viewing.

The changes of hue which take place according to the viewfinder viewing direction due to the use of the dichroic mirror is corrected as follows. FIG. 6 shows a viewfinder optical system and three light fluxes L0, L1 and L2 which pass through the viewfinder optical system in different directions. Each of the light fluxes L0, L1, L2 passes through the photo-taking lens 1 and is then reflected by the quick return mirror 2 to be imaged on the focusing screen 3. The light of the image thus formed comes to the pupil of the operator through the pentagonal prism 4, the light combining member 5 which is composed of the dichroic mirror, and the eyepiece 6. Assuming that the angles of incidence on the quick return mirror 2 of the light fluxes L0, L1 and L2 are $\theta 0$, $\theta 1$ and $\theta 2$, respectively, following relation is obtained:

$$\theta 0 < \theta 1 < \theta 2.$$

Generally, the quick return mirror 2 is set at an angle of 45 degrees relative to the optical axis of the photo-taking lens 1. Therefore, the angle of incidence $\theta 0$ is 45 degrees. Assuming that the angles of incidence of the light fluxes L0, L1 and L2 on the dichroic mirror are $\omega 0$, $\omega 1$ and $\omega 2$, respectively, the following relation is obtained:

$$\omega 2 < \omega 0 < \omega 1.$$

The angle of incidence on the dichroic mirror varies according to changes of the direction of viewing the viewfinder image in the vertical direction of the image. Therefore, it is preferable to have the spectral transmittance of the dichroic mirror remain unvarying irrespective of the angles of incidence on the dichroic mirror. However, the dichroic mirror in the embodiment is arranged to have the spectral transmittance characteristic as shown in FIG. 2 or in FIG. 4 with a dielectric material laminated on a glass base plate by vapor deposition. It is hardly possible to eliminate the incident angle dependency of the spectral transmittance of such a dichroic mirror. The use of such a dichroic mirror causes the hue of the viewfinder image to vary in the vertical direction thereof.

In the case of the dichroic mirror having the spectral transmittance characteristic as shown in FIG. 2, for example, the wavelength at which the transmission and reflection characteristics are inverted shifts toward shorter wavelengths as indicated by an arrow L in FIG. 2, when the angle of incidence on the dichroic mirror increases, and toward longer wavelengths as indicated by an arrow S when the angle of incidence decreases. If the characteristic of the dichroic mirror is considered alone, an upper part of the viewfinder image, i.e., the light flux L1 shown in FIG. 6, has a larger angle of incidence on the dichroic mirror, and a cut wavelength on the side of longer wavelengths which are transmissible shifts toward a shorter wavelength. As a result, a red component part drops out from the upper part of the viewfinder image to show it bluer to the operator than the color of the lower part of the image.

A lower part of the viewfinder image, i.e., the light flux L2 shown in FIG. 6, on the other hand, has a smaller angle of incidence on the dichroic mirror, and a cut wavelength on the side of longer wavelengths which are transmissible shifts toward a longer wavelength, thereby increasing a red component. As a result, the lower part of the viewfinder image appears redder than the upper part to the operator.

To prevent the change of hue in the vertical direction of the image, the quick return mirror 2 in the embodiment is formed by laminating a dielectric material having the characteristic similar to that of the dichroic mirror of the light combining member 5. The quick return mirror 2 is thus arranged to offset the change in hue caused by the dichroic mirror with a change in hue which is caused by the incident angle dependency of its reflection factor.

A quick return mirror adapted for a single-lens reflex camera is arranged in general to have roughly flat reflection characteristic for the wavelengths of visible spectrum. It has been considered to be desirable that such a quick return mirror has a small angle dependency. In the case of the embodiment, on the contrary, the quick return mirror 2 is composed of laminated thin films of a dielectric material, and the incident angle dependency of the reflection factor of the quick return mirror is used to form a good viewfinder system which includes the dichroic mirror and has a less amount of change in hue.

In the case of the embodiment as described above, the quick return mirror 2 having a lamination of dielectric films applied thereto is employed as a correcting means for preventing changes in hue. However, the arrangement of the correcting means disclosed may be changed, without deviating from the spirit and the scope of the invention, to apply the laminated films used for preventing the change of hue due to the dichroic mirror to some other suitable optical member, such as a reflection or transmission surface of a pentagonal prism, a lens surface, a transparent parallel flat plate, or the like.

However, the object of the invention can be most easily attained according to the arrangement of the embodiment described above, wherein the light combining member 5 is disposed in the viewfinder system to have its normal direction orthogonally intersect the normal direction of the quick return mirror 2, and a lamination of dielectric films of the characteristic similar to that of the dichroic film applied to the light combining member 5 is also applied to the quick return mirror 2.

In the meanwhile, during recent years, some of cameras have come to be arranged to have a function called a line-of-sight detecting function. The camera having this function is arranged to detect the viewing direction of the photographer looking into a viewfinder, i.e., a line of sight, and to adjust the focus or exposure of the camera according to the position of an object indicated by the line of sight. The following describes a viewfinder optical system adapted for such a camera that has the line-of-sight detecting function.

Figure 7:
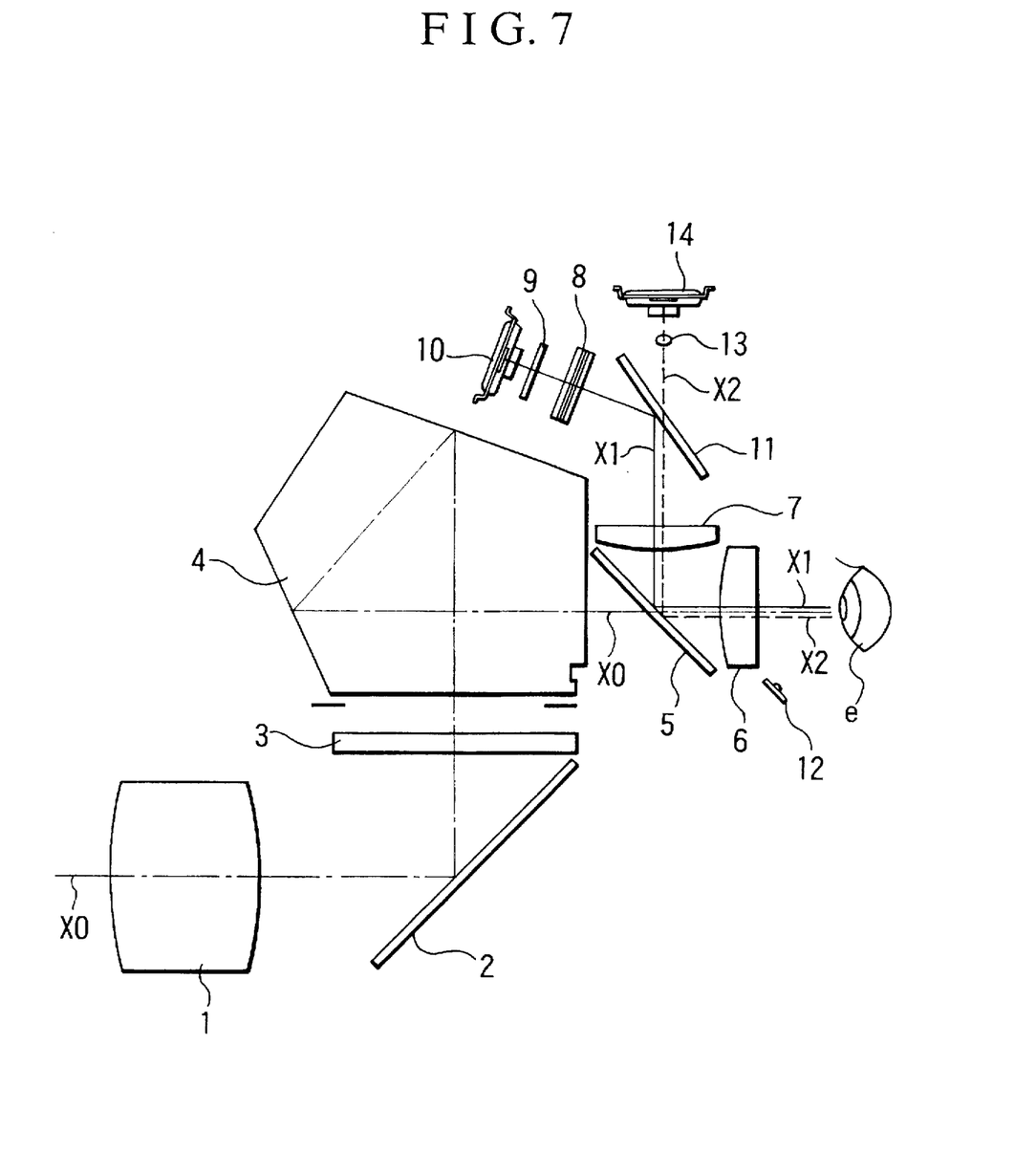
FIG. 7 is a schematic illustration showing in outline a single-lens reflex camera having a line-of-sight detecting function and arranged as another embodiment of the invention.

FIG. 7 shows a viewfinder optical system which is arranged as another embodiment of the invention by modifying the viewfinder optical system shown in FIG. 1 and is adapted for a camera having the above-stated line-of-sight detecting function. In FIG. 7, reference symbol "e" denotes the eye of the photographer. An optical member 11 is provided with a dichroic film which has a predetermined characteristic of spectral transmittance and arranged to split an optical path into an optical path for an image display and an optical path for line-of-sight detection. A light source 12 is arranged to emit an infrared light for illuminating the eye "e" of the photographer. The viewfinder optical system further includes an image forming lens 13 and a photo-electric conversion element 14 by which an image of the eye "e" is formed. Other parts shown in FIG. 7 are identical with those shown in FIG. 1 and, therefore, the details of them are omitted from the following description.

Further, in FIG. 7, reference symbol X0 denotes a viewfinder optical axis extending from the photo-taking lens 1 to the eye "e" of the photographer. Reference symbol X1 denotes a display optical axis extending from the light source 10 to the eye "e" of the photographer. Reference symbol X2 denotes an optical axis extending from the eye "e" of the photographer to the photo-electric conversion element 14 which is arranged to detect a pupil image from the eye "e" of the photographer.

Many methods have heretofore been developed for detection of a line of sight of the photographer. This embodiment employs one of these known methods, which is developed to detect a line of sight from the relation of a pupil to an image of a light source reflected by a cornea and has actually been applied to single-lens reflex cameras. In the embodiment shown in FIG. 7, the light source 12 is composed of an LED which emits light of wavelength longer than the wavelengths of visible light. The light emitted from the light source 12 illuminates the eye "e" of the photographer which is an object of the line-of-sight detection. The light reflected from the illuminated eye "e" passes through the eyepiece 6 to be reflected by the light combining member 5. The light reflected by the light combining member 5 passes through the projection lens 7 and the optical member 11 to be imaged on the photo-electric conversion element 14 through the image forming lens 13. An image of the pupil and a virtual image of the light source 12 reflected by the cornea of the eye "e" are both formed on the photo-electric conversion element 14. Then, the direction of the line of sight can be detected, by using a predetermined algorithm, from the positional relation between the image of the pupil and the virtual image of the light source 12.

Figure 8:
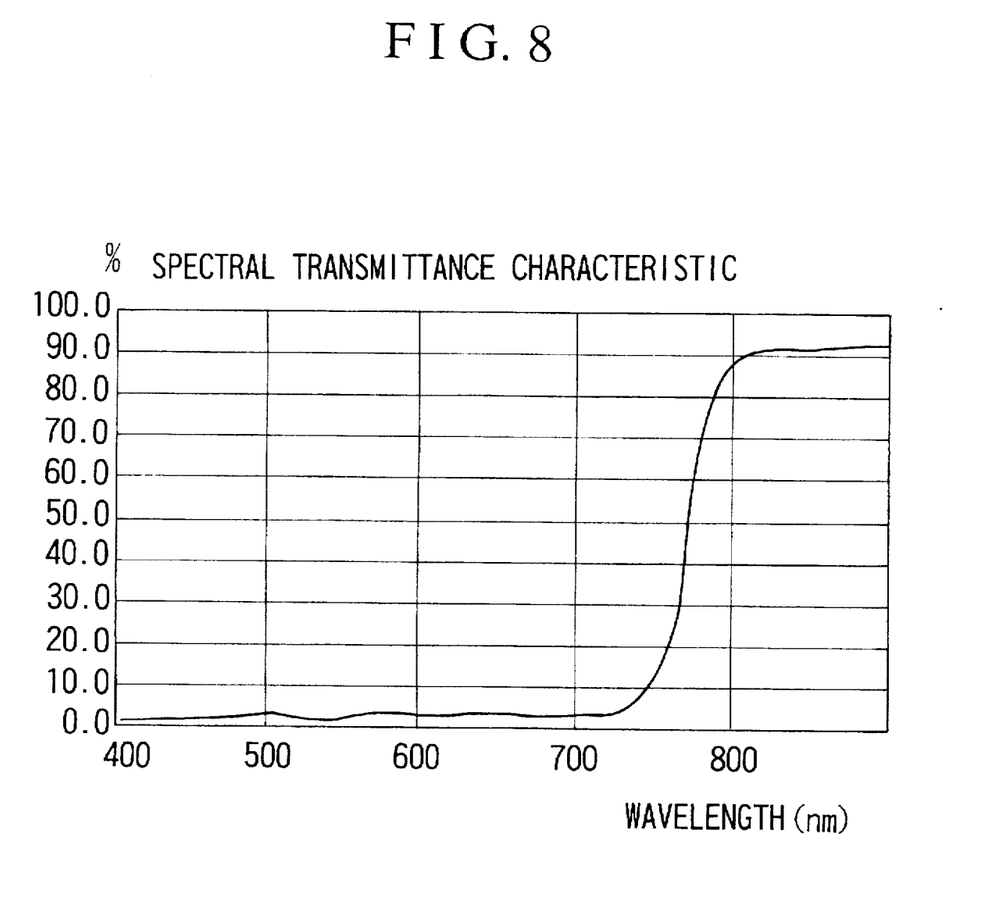
FIG. 8 shows the characteristic of spectral transmittance of an optical member 11 shown in FIG. 7.

In this embodiment, the light combining member 5 has the spectral transmittance characteristic shown in FIG. 2. The optical member 11, on the other hand, has a spectral transmittance characteristic shown in FIG. 8. As apparent from FIG. 8, the optical member 11 is a dichroic mirror which reflects the light of the visible spectrum and transmits the light of the infrared wavelength range. Accordingly, the infrared light reflected from the eye "e" of the photographer is reflected almost in its entirety by the light combining member 5, and is, then, transmitted almost in its entirety by the optical member 11. Therefore, the infrared light is efficiently guided to the photo-electric conversion element 14, so that the line of sight can be accurately detected. Further, in this embodiment, the liquid crystal panel 8 is illuminated by the light source 10 which is composed of an LED having its light emission center at 660 to 680 nm or thereabout. With the light source 10 used in conjunction with the optical member 11 and the light combining member 5, therefore, a display light flux is almost completely reflected to be efficiently guided to the eye "e" of the photographer.

Figure 9:
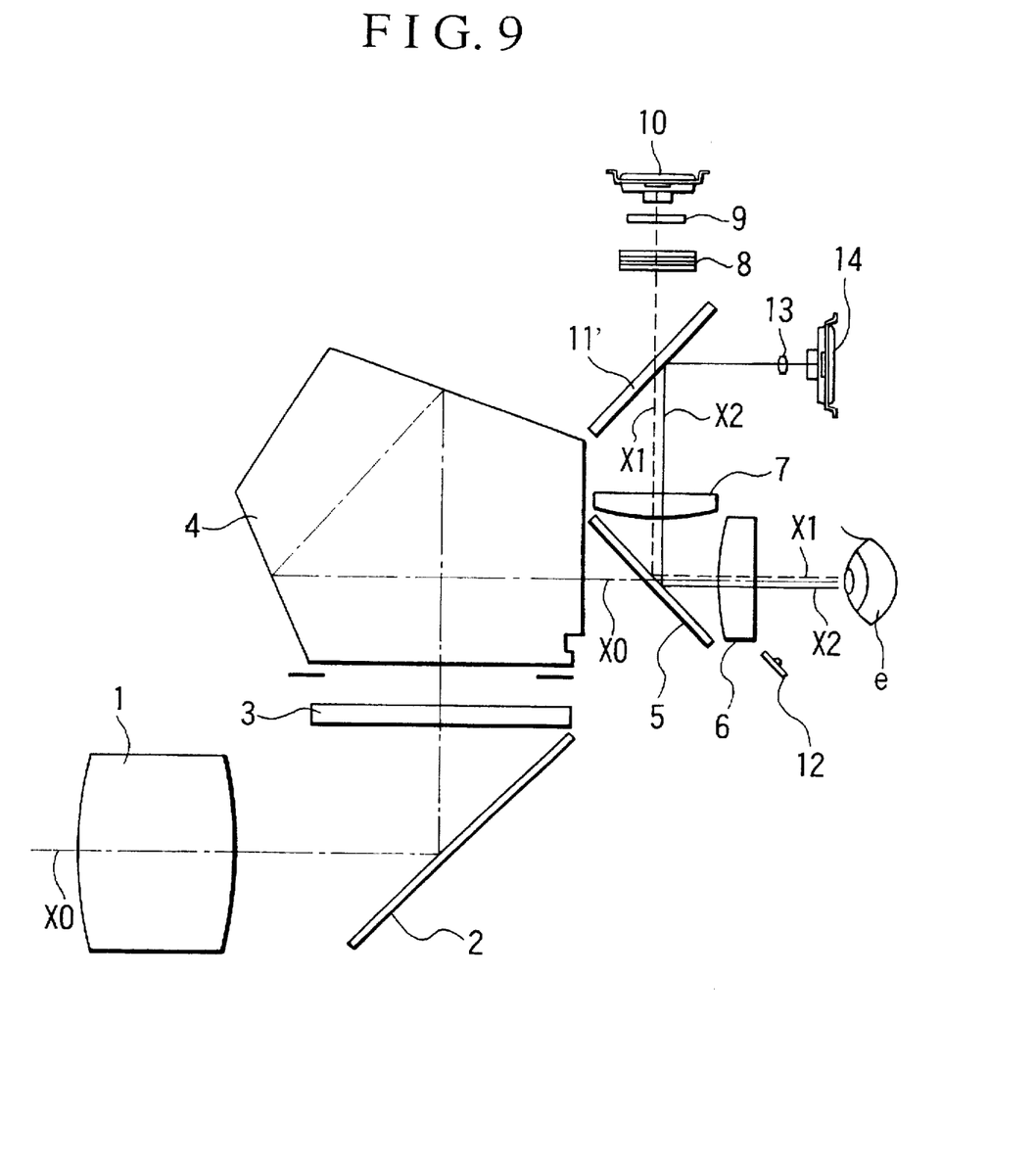
FIG. 9 is a schematic illustration showing in outline a single-lens reflex camera having a line-of-sight detecting function and arranged as a further embodiment of the invention.
Figure 10:
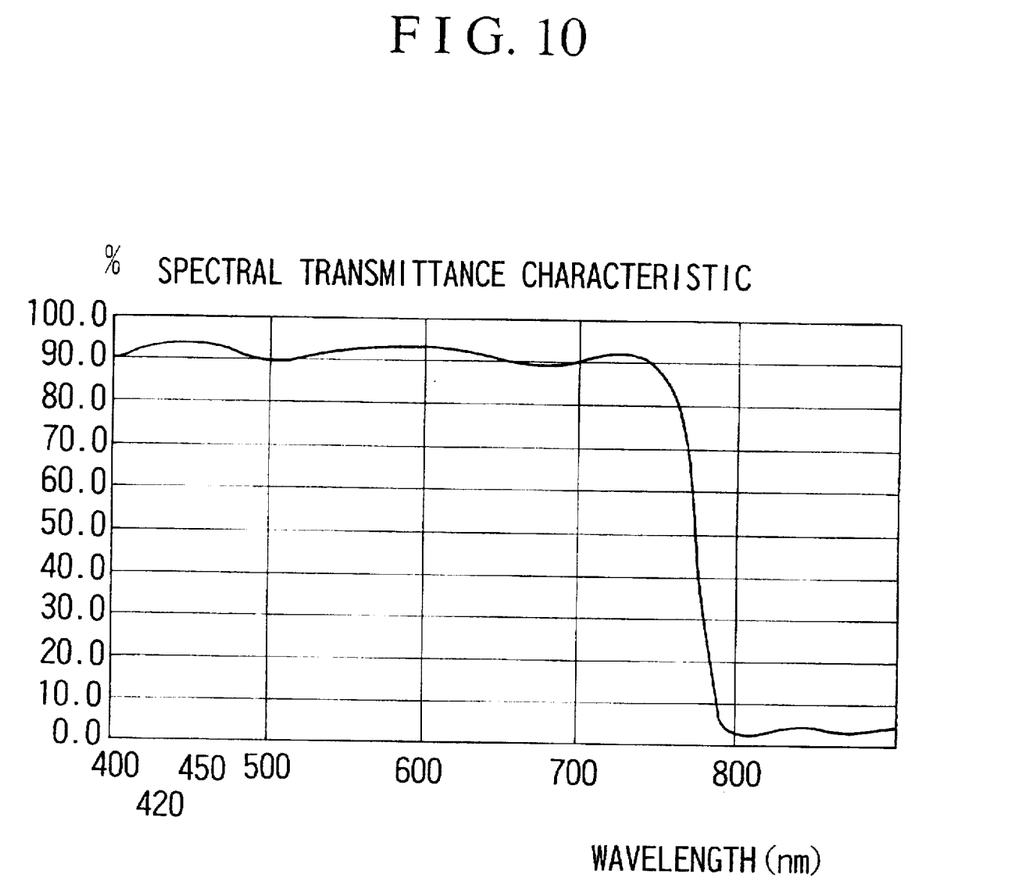
FIG. 10 shows the characteristic of spectral transmittance of an optical member 11' shown in FIG. 9.

FIG. 9 shows another viewfinder optical system having the line-of-sight detecting function and arranged in accordance with the invention as a further embodiment thereof. In FIG. 9, all members indicated by the same reference numerals as in FIG. 7 are identical with those shown in FIG. 7. In this embodiment, a line-of-sight detecting system is disposed in the light transmitting direction of an optical member 11' while a display optical system is disposed in the reflecting direction of the same optical member 11'. Therefore, the optical member 11' has a spectral transmittance characteristic of transmitting the light of the visible spectrum and reflecting the light of the infrared wavelength range. With the exception of what is mentioned above, the viewfinder optical system is arranged in the same manner as the system shown in FIG. 7.

As described above, a line-of-sight detecting system which is arranged as shown in FIG. 7 or FIG. 9 can be added to the viewfinder optical system shown in FIG. 1. This addition enables the camera to adjust focus or exposure to an object position looked at by the photographer.

An LED which emits a red color light is used for the light source 10 for the display optical system of each of the embodiments shown in FIGS. 7 and 9. However, the embodiment can be arranged to make an information display in a bluish purple color, instead of in a red color, by arranging the light source 10 to have its light emission center at 450 nm or thereabout. In such a modification, the light combining member 5 is arranged to be a dichroic mirror of a spectral transmittance characteristic whereby the light of around 450 nm and in the infrared range is reflected and other light of the visible spectrum is transmitted at a high transmittance.

I claim:

1. A viewfinder system comprising:

optical means for guiding light from an object to a viewer;

display means for displaying information in a visual field of said optical means;

light combining means, disposed in an optical path of said optical means, for combining the light from the object with the information displayed by said display means, said light combining means having spectral transmission characteristics which differ with angles of incidence of light; and correction means for keeping a spectral transmission characteristic of the entirety of said optical means substantially constant irrespectively of the angles of incidence of light on said light combining means.

2. A viewfinder system according to claim 1, wherein said display means provides a display by using light of a predetermined wavelength, and wherein said light combining means has different transmittances with respect to light of a wavelength band including the predetermined wavelength and light of wavelengths not included in the wavelength band.

3. A viewfinder system according to claim 2, wherein said light combining means has a low transmission characteristic with respect to light of the wavelength band including the predetermined wavelength and has a high transmission characteristic with respect to light of the wavelengths not included in the wavelength band.

4. A viewfinder system according to claim 3, wherein the light of the predetermined wavelength includes light of a long wavelength band in a visible spectrum.

5. A viewfinder system according to claim 3, wherein the light of the predetermined wavelength includes light of a short wavelength band in a visible spectrum.

6. A viewfinder system according to claim 1, wherein said light combining means is a dichroic mirror.

7. A viewfinder system according to claim 6, wherein said correction means is a reflecting member having laminated films, and wherein a normal direction of said reflecting member is perpendicular to a normal direction of said dichroic mirror.

8. A viewfinder system according to claim 7, wherein said optical means includes:

an objective lens;

a mirror which deflects light from said objective lens;

a focusing screen on which a real image of the object produced by said objective lens is formed;

an image inverting member which inverts the real image of the object formed on said focusing screen; and an eyepiece which guides the real image inverted by said image inverting member to the viewer, and wherein said correction means includes said mirror.

9. A viewfinder system according to claim 1, wherein said display means includes:

a light source which supplies illumination light;

a liquid crystal panel which is illuminated with the illumination light; and an optical member which sets said light source and a pupil of the viewer in a conjugate state.

10. A viewfinder system according to claim 9, wherein said optical member includes a Fresnel lens disposed on one side of said liquid crystal panel on which said light source is located, and a projection lens disposed on the other side of said liquid crystal panel on which said light combining means is located.

11. A viewfinder system according to claim 10, wherein said projection lens has an aspherical surface.

12. A viewfinder system according to claim 10, wherein said optical means includes:

a focusing screen;

an image inverting member which inverts a real image of the object formed on said focusing screen; and an eyepiece which guides the real image inverted by said image inverting member to the viewer, and wherein said light combining means is disposed between said image inverting member and said eyepiece.

13. A viewfinder system according to claim 12, satisfying the following condition:

$$fs/5 < ft < fs$$

where fs is a focal length of said eyepiece, and ft is a focal length of said projection lens.

14. A single-lens reflex camera comprising:

optical means for guiding light from an object to a viewer;

display means for displaying information in a visual field of said optical means;

light combining means, disposed in an optical path of said optical means, for combining the light from the object with the information displayed by said display means, said light combining means having spectral transmission characteristics which differ with angles of incidence of light; and correction means for keeping a spectral transmission characteristic of the entirety of said optical means substantially constant irrespectively of the angles of incidence of light on said light combining means.

15. A single-lens reflex camera according to claim 14, wherein said display means provides a display by using light of a predetermined wavelength, and wherein said light combining means has different transmittances with respect to light of a wavelength band including the predetermined wavelength and light of wavelengths not included in the wavelength band.

16. A single-lens reflex camera according to claim 15, wherein said light combining means has a low transmission characteristic with respect to light of the wavelength band including the predetermined wavelength and has a high transmission characteristic with respect to light of the wavelengths not included in the wavelength band.

17. A single-lens reflex camera according to claim 16, wherein the light of the predetermined wavelength includes light of a long wavelength band in a visible spectrum.

18. A single-lens reflex camera according to claim 16, wherein the light of the predetermined wavelength includes light of a short wavelength band in a visible spectrum.

19. A single-lens reflex camera according to claim 14, wherein said light combining means is a dichroic mirror.

20. A single-lens reflex camera according to claim 19, wherein said correction means is a reflecting member having laminated films, and a normal direction of said reflecting member is perpendicular to a normal direction of said dichroic mirror.

21. A single-lens reflex camera according to claim 20, wherein said optical means includes:

an objective lens;

a mirror which deflects light from said objective lens;

a focusing screen on which a real image of the object produced by said objective lens is formed;

an image inverting member which inverts the real image of the object formed on said focusing screen; and an eyepiece which guides the real image inverted by said image inverting member to the viewer, and wherein said correction means includes said mirror.

22. A single-lens reflex camera according to claim 14, wherein said display means includes:

a light source which supplies illumination light;

a liquid crystal panel which is illuminated with the illumination light; and an optical member which sets said light source and a pupil of the viewer in a conjugate state.

23. A single-lens reflex camera according to claim 22, wherein said optical member includes a Fresnel lens disposed on one side of said liquid crystal panel on which said light source is located, and a projection lens disposed on the other side of said liquid crystal panel on which said light combining means is located.

24. A single-lens reflex camera according to claim 23, wherein said projection lens has an aspherical surface.

25. A single-lens reflex camera according to claim 23, wherein said optical means includes:

a focusing screen;

an image inverting member which inverts a real image of the object formed on said focusing screen; and an eyepiece which guides the real image inverted by said image inverting member to the viewer, and wherein said light combining means is disposed between said image inverting member and said eyepiece.

26. A single-lens reflex camera according to claim 25, satisfying the following condition:

$$fs/5 < ft < fs$$

where fs is a focal length of said eyepiece, and ft is a focal length of said projection lens.

27. A viewfinder system according to claim 1, further comprising:

line-of-sight detection means for detecting a line of sight of the viewer.

28. A viewfinder system according to claim 27, wherein said line-of-sight detection means includes:

a light source arranged to supply infrared light for illuminating an eye of the viewer; and a photo-electric conversion element arranged to receive the infrared light reflected by the eye of the viewer, and wherein the infrared light reflected from the eye of the viewer is guided to said photo-electric conversion element through said light combining means.

29. A single-lens reflex camera according to claim 14, further comprising:

line-of-sight detection means for detecting a line of sight of the viewer.

30. A single-lens reflex camera according to claim 29, wherein said line-of-sight detection means includes:

a light source arranged to supply infrared light for illuminating an eye of the viewer; and a photo-electric conversion element arranged to receive the infrared light reflected by the eye of the viewer, and wherein the infrared light reflected from the eye of the viewer is guided to said photo-electric conversion element through said light combining means.

* * * * *